United States Patent [19]
Ono

[11] Patent Number: 5,883,978
[45] Date of Patent: Mar. 16, 1999

[54] IMAGE COMPRESSING METHOD AND IMAGE COMPRESSING APPARATUS

[75] Inventor: Natsushi Ono, Fukuoka, Japan

[73] Assignee: Matsushita Electric Industrial Co., Ltd, Osaka, Japan

[21] Appl. No.: 770,150

[22] Filed: Dec. 19, 1996

[30] Foreign Application Priority Data

Dec. 22, 1995 [JP] Japan .................................. 7-334581

[51] Int. Cl.$^6$ .............................. G06K 9/36; G06K 9/46; H04N 11/02; H04N 11/04
[52] U.S. Cl. .......................... 382/248; 382/232; 382/238; 348/394; 348/395; 348/398
[58] Field of Search .................................. 382/238, 240, 382/248, 232; 348/394, 395, 398, 400; 358/261.2, 261.3, 432

[56] References Cited

U.S. PATENT DOCUMENTS 5,598,214  1/1997  Kondo et al. ............................ 348/414

Primary Examiner—Leo M. Boudreau
Assistant Examiner—Dmitry A. Novik
Attorney, Agent, or Firm—Stevens, Davis, Miller & Mosher, L.L.P.

[57] ABSTRACT

In image compression utilizing wavelet conversion for dividing an image of one screen into subbands through multiple steps, subband data of a higher frequency is predicted from subband data of a lower frequency, subtraction is carried out between data obtained by the prediction and an actual higher-frequency subband coefficient at the same position as that for the predicted data to provide a difference, and only the difference is coded. By coding only the difference in this manner, a high compression ratio can be realized.

16 Claims, 14 Drawing Sheets

FIG. 5
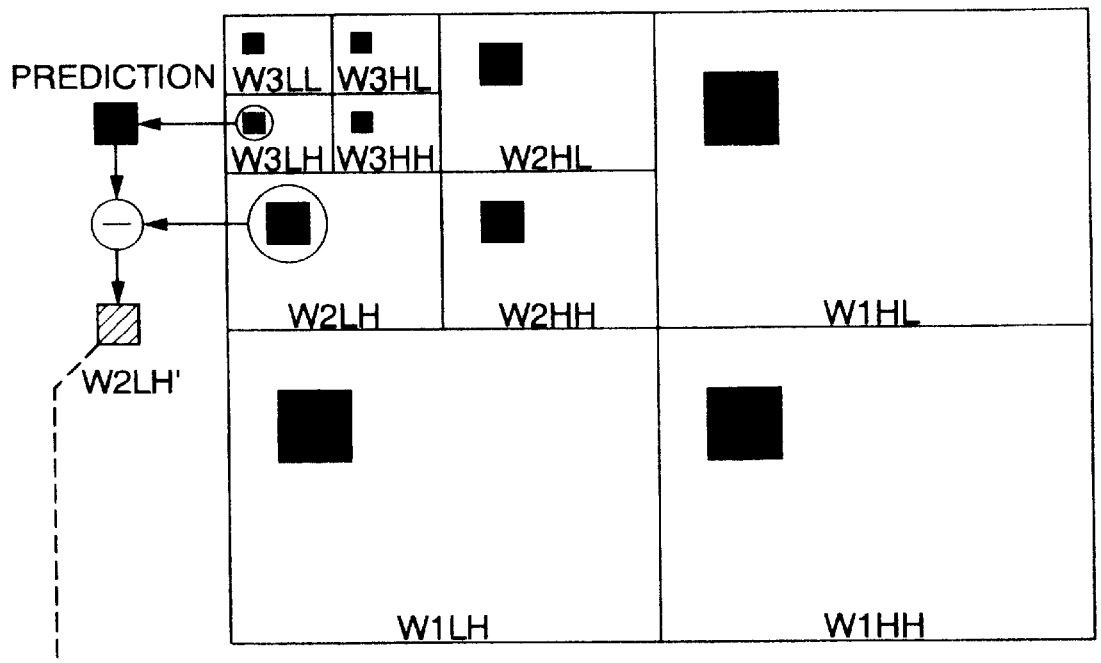
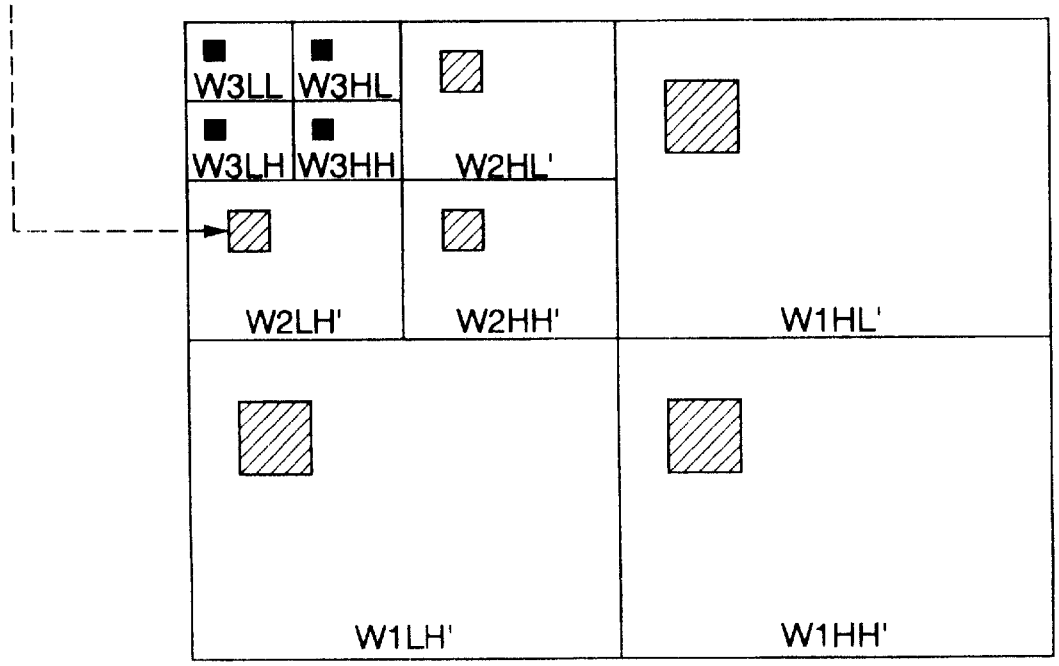

FIG. 11

| DENOTATION \ DIRECTION | | LONGITUDINAL | TRANSEVERSE | OBLIQUE |
|---|---|---|---|---|
| 1 | INTERMEDIATE FREQUENCY | 1/2 | 1/2 | 1/2 |
| 1 | HIGHER FREQUENCY | 1/4 | 1/4 | 1/4 |
| 2 | INTERMEDIATE FREQUENCY | 1/8 | 1/8 | 1/8 |
| 2 | HIGHER FREQUENCY | 1/4 | 1/4 | 1/4 |
| 3 | INTERMEDIATE FREQUENCY | 1/16 | 1/16 | 1/16 |
| 3 | HIGHER FREQUENCY | 1/16 | 1/16 | 1/16 |
| 4 | INTERMEDIATE FREQUENCY | 1/4 | 1/4 | 1/4 |
| 4 | HIGHER FREQUENCY | 1/8 | 1/8 | 1/8 |
| 5 | INTERMEDIATE FREQUENCY | 1/16 | 1/16 | 1/16 |
| 5 | HIGHER FREQUENCY | 1/20 | 1/20 | 1/20 |

| W3LL | W3HL | W2HL | W1HL |
|------|------|------|------|
| W3LH | W3HH | | |
| W2LH | | W2HH | |
| W1LH | | | W1HH |

IMAGE COMPRESSING METHOD AND IMAGE COMPRESSING APPARATUS

BACKGROUND OF THE INVENTION

The present invention relates to an image compressing method and an image compressing apparatus which are used for image compression or the like operation.

In techniques for high-efficiency coding of images presupposing communication media or recording media, a technique using DCT (discrete cosine conversion) has been gaining widespread applications. A technique for compression using the DCT, however, faces essential problems that with the compression ratio increased, block distortion, mosquito noise and the like are visually recognized and the compression ratio is limited.

Accordingly, new compressing methods have recently been proposed for the purpose of improving the compression ratio and especially, a compressing technique using wavelet conversion which is one of subband coding modes has been highlighted. By using the wavelet conversion, block distortion which would otherwise take place in the DCT can be eliminated because the concept of block is not involved in the wavelet conversion and image quality can be visually improved to a great extent.

Of the DCT and the wavelet technique, the DCT dealing with digital images can advantageously conserve high-frequency components by increasing the compression ratio but conversely, visually prominent distortion constructed of high-frequency components takes place. On the other hand, in the case of the wavelet technique dealing with analog images, high-frequency components are spontaneously dropped off as the compression ratio increases. In other words, the signal band is gradually cut starting with a high-frequency portion. As a result, the resolution decreases as a whole and visual image quality is less degraded for the same compression ratio in the wavelet technique than in the DCT.

A conventional wavelet image compressing apparatus will now be described with reference to FIG. 13. Firstly, in the compressing processing of moving image data, input image data is fed to a frame memory 101. Subsequently, output data from the frame memory 101 is fed to a wavelet converter 102. The wavelet conversion will be described below in greater detail.

FIG. 14 is a block diagram showing the operation processing of the wavelet conversion. As shown in FIG. 14, an input image data is inputted to a horizontal low-pass filter (LPF) and a horizontal high-pass filter (HPF) in order that the band in the horizontal direction is divided into halves and the data amount in each half is thinned out by down sampling to a half by means of a ½ subsampler (downward arrow). The input image data whose data amount has been thinned out to the half through the horizontal low-pass filter (LPF) is inputted to a vertical low-pass filter (LPF) and a vertical high-pass filter (HPF) in order that the band in the vertical direction is divided into halves and the data amount in each half is thinned out by down sampling to a half by means of a ½ subsampler (downward arrow).

It is now assumed that an input image data component which is passed through the horizontal low-pass filter (LPF), thinned out to the halved data amount, passed through the subsequent vertical high-pass filter (HPF) and thinned out to the halved data amount results in image data designated by W1LH, that an input image data component which is passed through the horizontal high-pass filter (HPF), thinned out to the halved data amount, passed through the subsequent vertical low-pass filter (LPF) and thinned out to the halved data amount results in image data designated by W1HL, and that an input image data component which is passed through the horizontal high-pass filter (HPF), thinned out to the halved data amount, passed through the subsequent vertical high-pass filter (HPF) and thinned out to the halved data amount results in image data designated by W1HH.

A component which is passed through the aforementioned horizontal low-pass filter (LPF), thinned out to the halved data amount, passed through the subsequent vertical low-pass filter (LPF) and thinned out by down sampling to the halved data amount is again subjected to the above processing. Through the repetition of the processing, coefficient data pieces can eventually be obtained by dividing the frequency in the horizontal and vertical directions along the lower-frequency region and decreasing the data amount to a half and these coefficient data pieces are cumulated. Wavelet conversion coefficient signals in a plurality of frequency bands are shown in a diagram of FIG. 15.

For convenience of explanation, a state of the wavelet conversion effected up to the third operation is shown in FIG. 14. Thus, the coefficient data pieces subject to the wavelet conversion are distributed in the horizontal and vertical directions to form a hierarchical structure.

Returning to FIG. 13, coefficients associated with the respective frequency bands obtained through the conversion by the wavelet converter 102 having the above characteristics are quantized by a quantizing unit 103 and data pieces delivered out of the quantizing unit 103 are coded by a variable length coding unit 104 in such a manner that a greater amount of information is allotted to a data piece, of data pieces delivered out of the quantizing unit 103, which occurs at a higher probability. In this manner, the compression processing of the input image can be carried out while the information amount of the entire data being decreased.

In the expansion processing, a conversion mode can be carried out in which images in the four W3 regions are decoded to W1 images in FIG. 15 to superimpose the higher-frequency component on the lower-frequency component, thereby improving the resolution stepwise.

In the conventional construction, however, the coefficient of the higher-frequency subband is coded in an ordinary manner for not only a portion at which the coefficient of the lower-frequency subband is "0" but also a portion at which it is not "0".

SUMMARY OF THE INVENTION

The present invention has been made in the light of the aforementioned prior art and it is an object of the present invention to provide an image compressing method and an image compressing apparatus which can realize a high compression ratio by decreasing the information amount of a coefficient of, especially, the higher-frequency subband and by coding the coefficient.

According to an embodiment of the present invention, in an image compressing method using, as a conversion mode of the image compressing processing, wavelet conversion for decomposing image data into image data pieces of a plurality of frequency bands in coding of a moving image signal utilizing inter-image correlation, a coefficient of a higher-frequency subband is predicted on wavelet space from a coefficient of a lower-frequency subband, and when the higher-frequency subband space is coded, only a difference from the predicted coefficient is coded. According to this image compressing method, the coding amount can be decreased.

According to another embodiment of the present invention, in an image compressing method using, as a conversion mode of the image compressing processing, wavelet conversion for decomposing image data into image data pieces of a plurality of frequency bands, a coefficient of each subband is compared with a coefficient of a lower-frequency subband on wavelet space, a ratio of the coefficient of each subband to the lower-frequency subband is calculated for each input image to provide a "subband/coefficient" characteristic, a coefficient of a higher-frequency subband is predicted from a coefficient of a lower-frequency subband by utilizing the "subband/coefficient" characteristic, and when the higher-frequency subband space is coded, only a difference from the predicted coefficient together with the "subband/coefficient" characteristic is coded. This construction is achieved by perceiving that the image includes artificial images such as animations and computer graphics and these images often have such particularity that the frequency component is more offset to a higher-frequency component and a lower-frequency component in these images than in natural images, and according to the image compressing method according to this embodiment, prediction is not applied to any images in the same manner but a coefficient of the higher-frequency subband is predicted using a "subband/coefficient" characteristic determined for individual input images, so that even for an input image which is an artificial image having particularity, the predicted coefficient can more approximate an actual value and the coding amount can be more decreased while decreasing distortion of a reconstructed image.

In an image compressing method of another embodiment of the present invention, in consideration of the correlation between data pieces of an input image in longitudinal, transverse and oblique directions, directionally different "subband/coefficient" characteristics are calculated in the longitudinal, transverse and oblique directions on the wavelet space and when the higher-frequency subband space is coded, only a difference from the predicted coefficient together with the directionally different "subband/coefficient" characteristic is coded. Generally, an image has strong correlation in the longitudinal, transverse and oblique directions and the "subband/coefficient" characteristics in the longitudinal, transverse and oblique directions differ for different picture patterns. Therefore, in the image compressing method of this embodiment, the directionally different "subband/coefficient" characteristics in the longitudinal, transverse and oblique directions are determined and based on these values, higher-frequency subband coefficients in the respective directions are predicted, so that predicted values can more approximate actual values and the coding amount can be decreased while more decreasing distortion of a reconstructed image.

In an image compressing method of another embodiment of the present invention, some predictable typical "subband/coefficient" characteristics are prepared in advance, these characteristics are assigned with denotations and stored in a "subband/coefficient" characteristic table, a coefficient of each subband is compared with a coefficient of a lower-frequency subband on the wavelet space, a ratio of the coefficient of each subband to the lower-frequency subband is calculated for each input image, it is calculated which one of the typical "subband/coefficient" characteristics stored in the "subband/coefficient" characteristic table the calculated ratio is the most proximate to, and when higher-frequency subband space is coded, a "subband/coefficient" characteristic determined to be in the most proximity is indicated by a denotation and coded and at the same time only a difference from a coefficient predicted from the "subband/coefficient" characteristic determined to be in the most proximity is coded. By determining the typical "subband/coefficient" characteristics in advance and by coding information as to which one of the "subband/coefficient" characteristics is utilized for prediction, the data amount can be more decreased than in the case where the "subband/coefficient" characteristics are coded directly.

An image compressing apparatus according to another embodiment of the present invention comprises a frame memory for storing image data of one screen, a wavelet converter for dividing an image of one screen into subbands through multiple steps by carrying out some cycles of the processing in which the band of an input signal delivered out of the frame memory is divided into halves by means of a low-pass filter and a high-pass filter and divided data pieces are each thinned out by down sampling to a half so as to decrease the data amount, a wavelet coefficient memory unit for storing coefficients delivered out of the wavelet converter, a subband coefficient predicting unit for predicting a coefficient of a higher-frequency subband from a coefficient of a lower-frequency subband stored in the wavelet coefficient memory unit, a predicted coefficient memory unit for storing the coefficient predicted by the subband coefficient predicting unit, a wavelet coefficient subtracting processing unit for performing subtraction between the coefficient of the higher-frequency subband stored in the predicted coefficient memory unit and a subband coefficient stored in the wavelet coefficient memory unit at the same position as that for the predicted coefficient, a subtraction result memory unit for storing results of subtraction by the wavelet coefficient subtracting processing unit, a quantizing unit for quantizing, subband by subband, coefficients stored in the subtraction result memory unit, and a variable length coding unit adapted to decrease the information amount of the entire data by allotting a larger amount of information to a data piece, of data pieces delivered out of the quantizing unit, which occurs at a higher probability.

In the image compressing apparatus of this embodiment, an image compressing apparatus of a variation thereof comprises a "subband/coefficient" characteristic calculating unit for calculating, from a coefficient after the wavelet conversion stored in the wavelet coefficient memory unit, a "subband/coefficient" characteristic indicative of a ratio of each of the coefficients of the higher-frequency subband and intermediate-frequency subband to the coefficient of the lower-frequency subband in connection with ratios between the coefficients of the respective subbands for an input image, the subband coefficient predicting unit predicts a coefficient of the higher-frequency subband from a coefficient of the lower-frequency subband by utilizing the "subband/coefficient" characteristic, and the variable length coding unit codes only a difference from the predicted coefficient together with the "subband/coefficient" characteristic. In the imaging compressing apparatus, prediction is not applied to any images in the same manner but the coefficient of the higher-frequency subband is predicted using a "subband/coefficient" characteristic determined for each input image, so that the predicted coefficient can more approximate an actual value and the coding amount can be decreased while more decreasing distortion of a reconstructed image.

In the image compressing apparatus of this embodiment, an image compressing apparatus of another variation thereof comprises a directionally different "subband/coefficient" characteristic calculating unit for calculating, from a coefficient after the wavelet conversion stored in the wavelet coefficient memory unit, a directionally different "subband/coefficient" characteristic indicative of a ratio of each of the coefficients of the higher-frequency subband and intermediate-frequency subband to the coefficient of the lower-frequency subband in connection with ratios between the coefficients of respective subbands for an input image in longitudinal, transverse and oblique directions, the subband coefficient predicting unit predicts the coefficient of the higher-frequency subband from the coefficient of the lower-frequency subband by utilizing the directionally different "subband/coefficient" characteristics, and the variable length coding unit codes only a difference from the predicted coefficient together with the directionally different "subband/coefficient" characteristics. In the image compressing apparatus, "subband/coefficient" characteristics in the longitudinal, transverse and oblique directions are determined and the higher-frequency subband coefficients in the respective directions are predicted, so that the predicted value can more approximate an actual value and the coding amount can be decreased while more decreasing distortion of a reconstructed image.

In the image compressing apparatus of this variation, an image compressing apparatus of a further variation comprises a "subband/coefficient" characteristic table for storing typical "subband/coefficient" characteristics and a "subband/coefficient" characteristic selector for deciding which one of "subband/coefficient" characteristics stored in the "subband/coefficient" characteristic table a "subband/coefficient" characteristic for a present input image obtained by the directionally different "subband/coefficient" characteristic calculating unit is the most proximate to. According to the image compressing apparatus, information as to which one of characteristics in the typical "subband/coefficient" characteristics determined in advance is utilized for prediction is coded, so that the data amount can be decreased more greatly than in the case where the "subband/coefficient" characteristic is coded directly and the coding amount can be decreased.

BRIEF DESCRIPTION OF THE DRAWINGS

FIG. 5 is a diagram for explaining prediction in a subband coefficient predicting unit and the processing of subtraction between a predicted subband coefficient and a subband coefficient at the same position as that for the predicted coefficient in the embodiment of the present invention.

FIG. 11 is a table showing the contents of a "subband/coefficient" characteristic table in embodiment 4 of the present invention.

FIG. 15 is a diagram showing wavelet space.

DESCRIPTION OF THE PREFERRED EMBODIMENTS

Embodiments of an image compressing apparatus according to the present invention will now be described.

(Embodiment 1)

Figure 1:
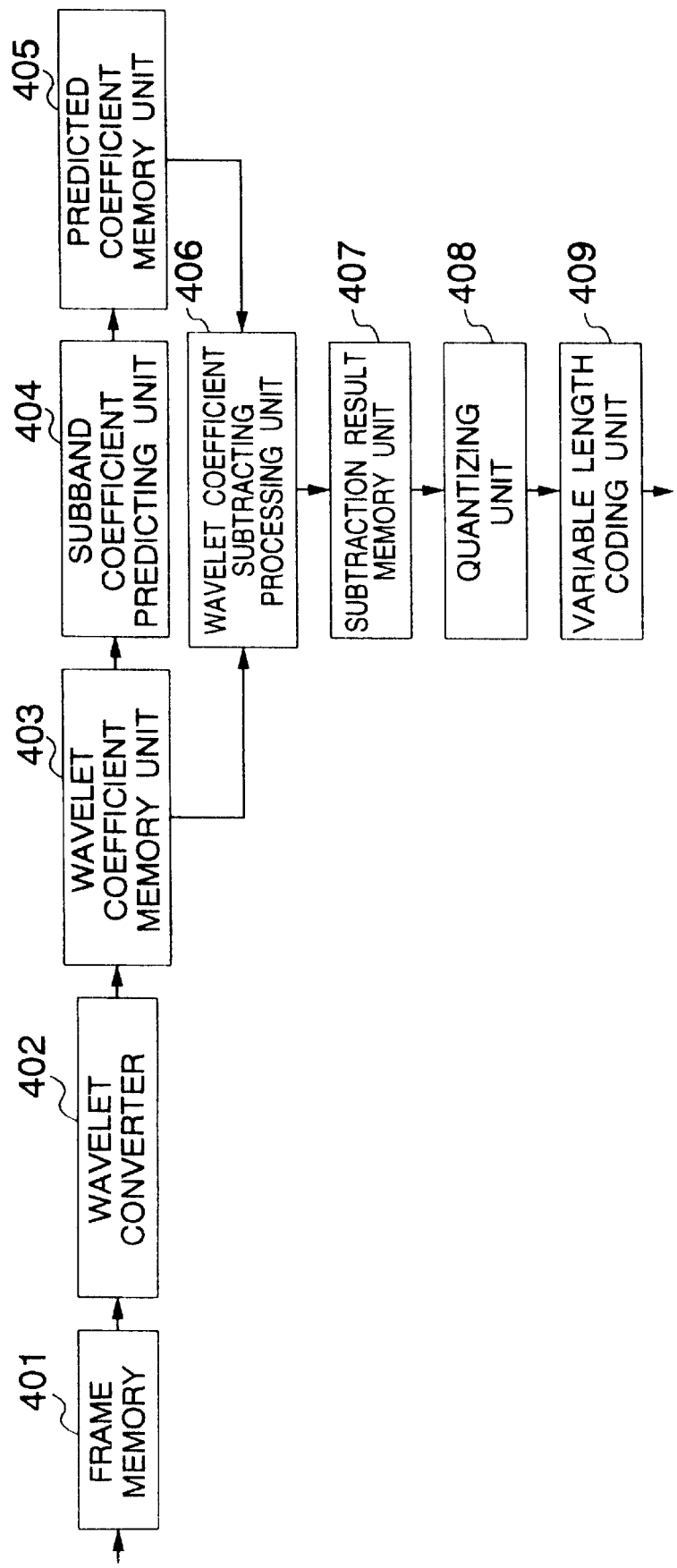
FIG. 1 is a block diagram showing the construction of a wavelet image compressing apparatus according to embodiment 1 of the present invention.

FIG. 1 is a circuit block diagram of an image compressing apparatus according to the first embodiment of the present invention.

Referring to FIG. 1, a frame memory 401 stores image data of one screen. A wavelet converter 402 divides an image of one screen into subbands through multiple steps by carrying out some cycles of the processing in which the band of an input signal delivered out of the frame memory 401 is divided into halves by means of a low-pass filter and a high-pass filter and divided data pieces are each thinned out by down sampling to a half so as to decrease the data amount. A wavelet coefficient memory unit 403 stores coefficients delivered out of the wavelet converter 402.

A subband coefficient predicting unit 404 predicts a coefficient of a subband which is higher than a low-frequency subband, that is, a higher-frequency subband from a coefficient of the low-frequency subband stored in the wavelet coefficient memory unit 403, and a predicted coefficient memory unit 405 stores the coefficient predicted by the subband coefficient predicting unit 404. A wavelet coefficient subtracting processing unit 406 performs subtraction between the coefficient of the higher-frequency subband stored in the predicted coefficient memory unit 405 and a subband coefficient stored in the wavelet coefficient memory unit 403 at the same position as that for the predicted coefficient. A subtraction result memory unit 407 stores results of subtraction by the wavelet coefficient subtracting processing unit 406.

A quantizing unit 408 quantizes coefficients stored in the subtraction result memory unit 407 subband by subband. A variable length coding unit 409 is adapted to decrease the information amount of the entire data by allotting a larger amount of information to a data piece, of data pieces delivered out of the quantizing unit 408, which occurs at a higher probability.

While in the foregoing description the predicted coefficient memory unit 405 and subtraction result memory unit 407 are constructed of different memories, these units may be realized with the same memory because they are not used concurrently.

Figure 2:
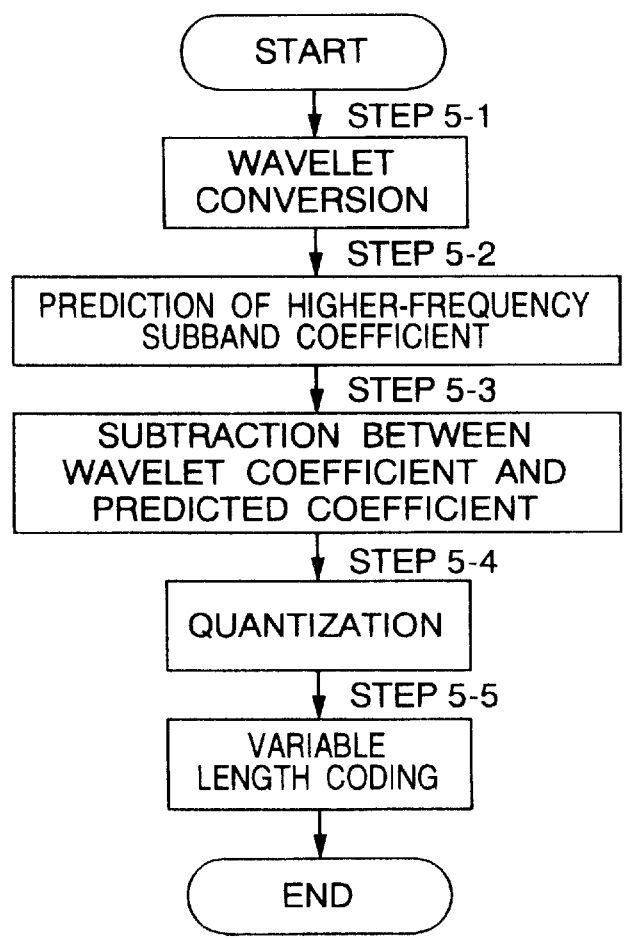
FIG. 2 is a flow chart showing image data compressing operation in the embodiment 1 of the present invention.

An image compressing operation in the image compressing apparatus of embodiment 1 constructed as above will now be described with reference to a flow chart of FIG. 2.

Figure 3:
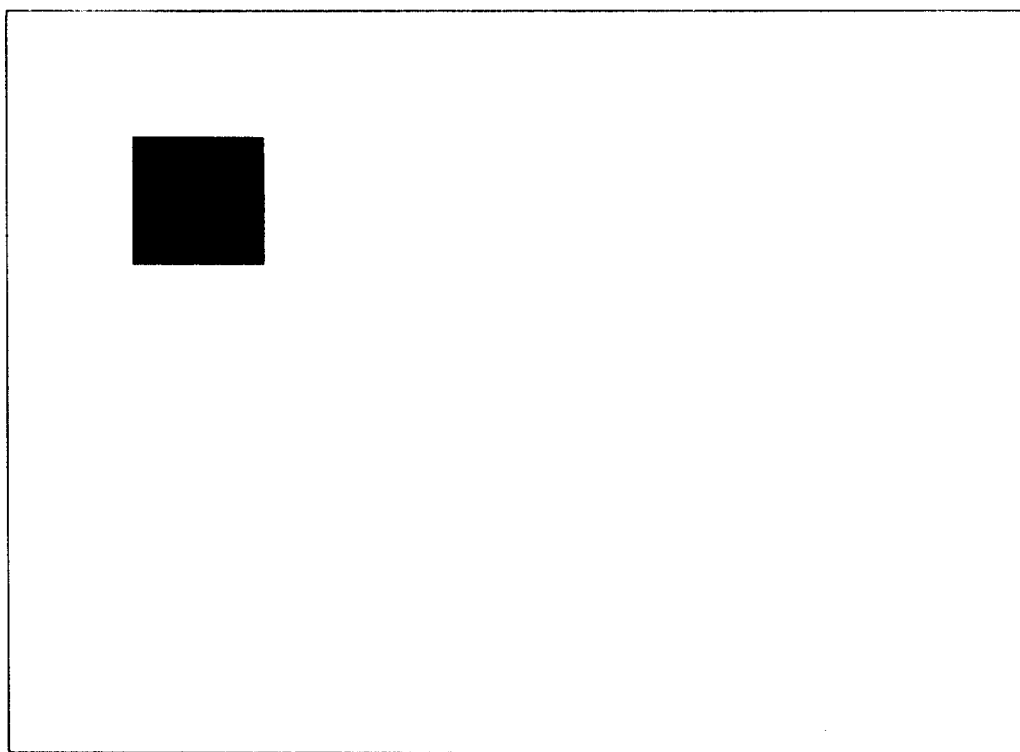
FIG. 3 is a diagram showing an example of an input image in the embodiment of the present invention.

It is presupposed that an image of one screen shown in FIG. 3 is stored in the frame memory 401 and through the wavelet conversion, the image is divided into 10 regions in four subbands of DC component, lower-frequency subband, intermediate-frequency subband and higher-frequency subband.

Figure 4:
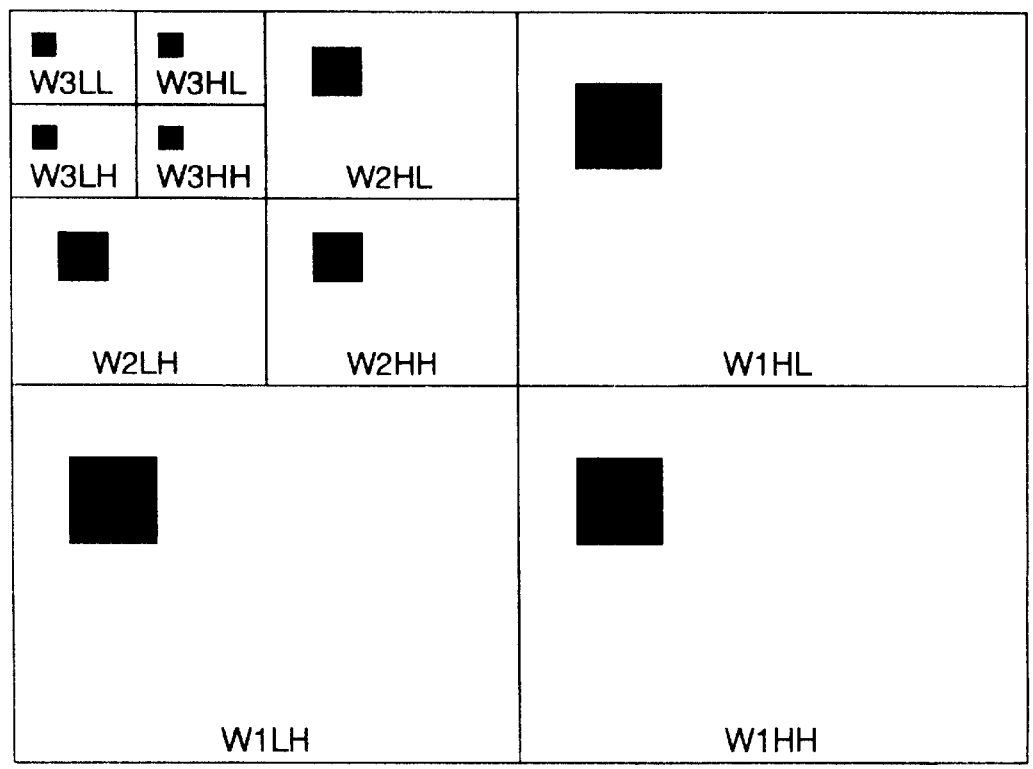
FIG. 4 is a diagram showing the contents of a wavelet coefficient memory unit in the embodiment of the present invention.

Firstly, in step 5-1, the wavelet converter 402 performs the wavelet conversion by making reference to the contents of the frame memory 401 and writes conversion results in the wavelet coefficient memory unit 403. FIG. 4 shows the contents of the wavelet coefficient memory unit 403 after the wavelet conversion. In the figure, W3LL indicates a DC component, W3HL, W3HH and W3LH indicate lower-frequency subbands, W2HL, W2HH and W2LH indicate intermediate-frequency subbands and W1HL, W1HH and W1LH indicate higher-frequency subbands.

In step 5-2, the subband coefficient predicting unit 404 predicts a coefficient of a higher-frequency subband by making reference to a lower-frequency subband of the wavelet coefficient memory unit 403. Here, the prediction of the higher-frequency coefficient proceeds from the lower frequency to the intermediate frequency and from the intermediate frequency to the higher frequency.

More specifically, in FIG. 4, a coefficient of the intermediate-frequency subbands indicated by W2HL, W2HH and W2LH is predicted from a coefficient (a coordinate point of which is represented by (x, y)) of the lower-frequency subbands indicated by W3HL, W3HH and W3LH and a coefficient of the higher-frequency subbands indicated by W1HL, W1HH and W1LH is then predicted in a manner to be described below. More particularly, on the assumption that the coefficient of the lower-frequency subbands is fo at coordinates (x, y), the coefficient of the intermediate-frequency subbands is predicted to be fo/2 at coordinate points (2x, 2y), (2x+1, 2y), (2x, 2y+1) and (2x+1, 2y+1). FIG. 5 is a diagram for explaining the prediction by the subband coefficient predicting unit and the subtraction processing between a predicted coefficient of the higher-frequency subbands and a subband coefficient at the same position as that for the predicted coefficient. In FIG. 5, there is illustrated the behavior of predicting a coefficient of the intermediate-frequency subband indicated by W2LH from a coefficient of the lower-frequency subband indicated by W3LH.

Further, on the assumption that a coefficient at coordinates (x, y) is f1, a coefficient of the higher-frequency subbands is predicted to be f1/2 at coordinate points (2x, 2y), (2x+1, 2y), (2x, 2y+1) and (2x+1, 2y+1). The coefficients predicted by the subband coefficient predicting unit 404 in the manner as above are written in the predicted coefficient memory unit 405.

In step 503, the following processing proceeds. The DC component is not used for prediction of the coefficient of the higher-frequency subbands and therefore, in connection with the DC component, the subtraction processing is not carried out and the contents of the wavelet coefficient memory unit 403 is written, without alteration, in the subtraction result memory unit 407. The lower-frequency subbands do not undergo prediction, either, and therefore in connection with the lower-frequency subbands, the contents of the wavelet coefficient memory unit 403 is written, without alteration, in the subtraction result memory unit 407.

In connection with the intermediate-frequency subbands and the higher-frequency subbands, the wavelet coefficient subtracting processing unit 406 performs subtraction between a coefficient of the higher-frequency subbands in the predicted coefficient memory unit 405 and a subband coefficient in the wavelet coefficient memory unit 403 at the same position as that for the predicted coefficient and a subtraction result is written in the subtraction result memory unit 407. In FIG. 5, the subtraction processing is shown which is carried out between a coefficient (corresponding to coordinates of W2LH) predicted from a coefficient of a lower-frequency subband indicated by, for example, W3LH and an actual coefficient of an intermediate-frequency subband indicated by W2LH.

In step 5-4, the quantizing unit 408 quantizes, subband by subband, coefficients resulting from the subtraction and stored in the subtraction result memory unit 407.

In step 5-5, the variable length coding unit 409 decreases the amount of information of the entire data by allotting a larger amount of information to a data piece, of data pieces delivered out of the quantizing unit 408, which occurs at a higher probability.

Since results of quantizing the coefficients stored in the subtraction result memory 407 in the step 5-4 represents differences from predicted coefficients in connection with the intermediate-frequency and higher-frequency subbands, data to be quantized is expected to be largely offset toward the proximity of "0". Accordingly, data delivered out of the variable length coding unit 409 can be compressed at a high compression ratio.

While in the present embodiment the method of predicting the coefficients of the intermediate-frequency subbands and the higher-frequency subbands from the coefficients of the lower-frequency subbands has been described, similar effects can be obtained by performing prediction utilizing the DC component.

(Embodiment 2)

Figure 6:
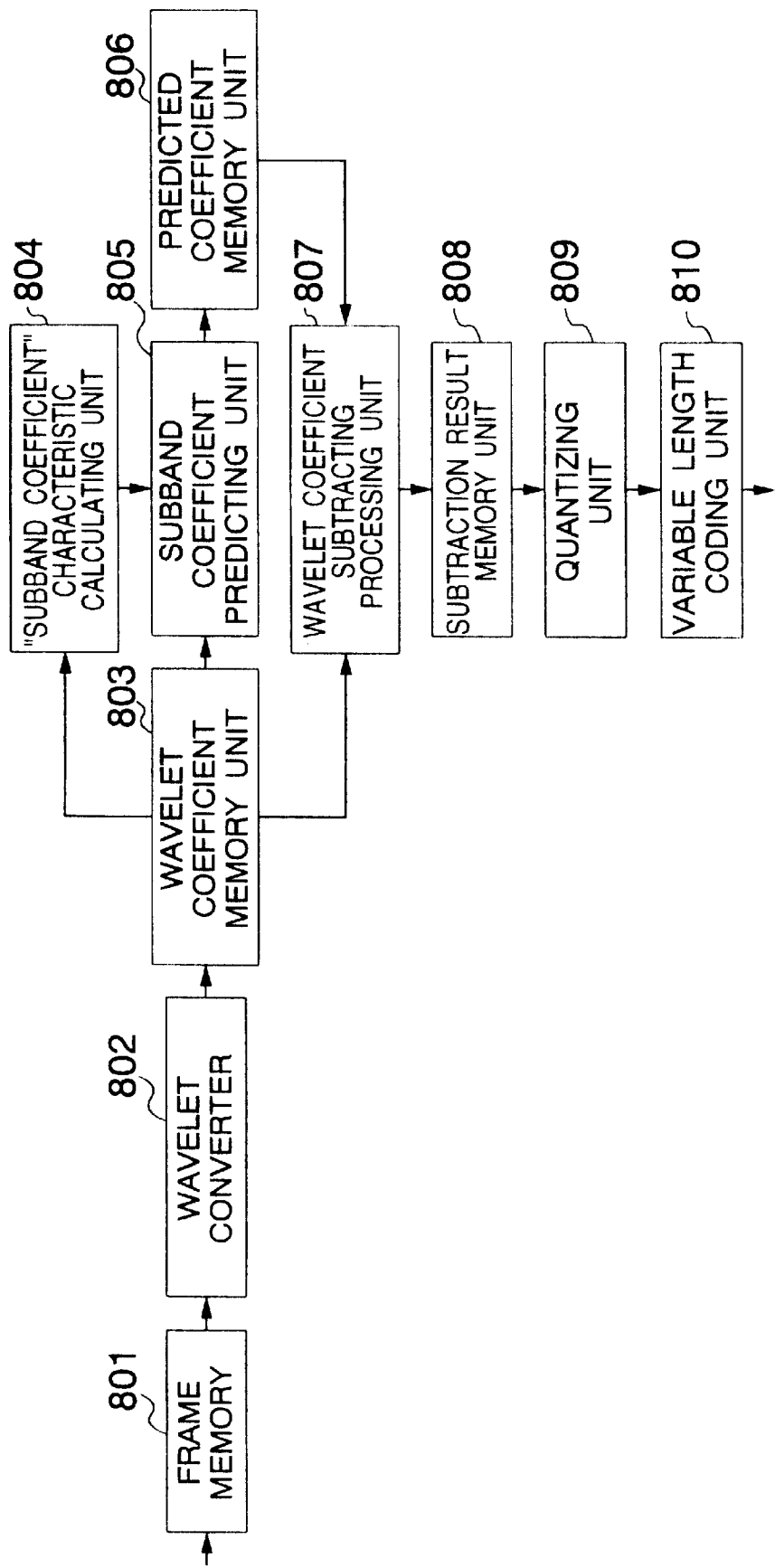
FIG. 6 is a block diagram showing the construction of a wavelet image compressing apparatus according to embodiment 2 of the present invention.

FIG. 6 is a circuit block diagram of an image compressing apparatus according to a second embodiment of the present invention.

Referring to FIG. 6, a frame memory 801 stores image data of one screen. A wavelet converter 802 divides an image of one screen into subbands through multiple steps by carrying out some cycles of the processing in which the band of an input signal delivered out of the frame memory 801 is divided into halves by means of a low-pass filter and a high-pass filter and divided data pieces are each thinned out by down sampling to a half so as to decrease the data amount. A wavelet coefficient memory unit 803 stores coefficients delivered out of the wavelet converter 802.

A "subband/coefficient" characteristic calculating unit 804 calculates a "subband/coefficient" characteristic for an input image from a coefficient after the wavelet conversion stored in the wavelet coefficient memory unit 803. By making reference to the contents of the wavelet coefficient memory unit 803, the "subband/coefficient" characteristic calculating unit 804 determines an average of ratios each between a "coefficient of a lower-frequency subband" and a "coefficient of an intermediate-frequency subband" and an average of ratios each between a "coefficient of an intermediate-frequency subband" and a "coefficient of a higher-frequency subband".

A subband coefficient predicting unit 805 predicts a coefficient of the higher-frequency from a coefficient of the lower-frequency subband stored in the wavelet coefficient memory unit 803, and a predicted coefficient memory unit 806 stores the coefficient predicted by the subband coefficient predicting unit 805. A wavelet coefficient subtracting processing unit 807 performs subtraction between the coefficient of the higher-frequency subband stored in the predicted coefficient memory unit 806 and a subband coefficient stored in the wavelet coefficient memory unit 803 at the same position as that for the predicted coefficient and a subtraction result memory unit 808 stores results of subtraction by the wavelet coefficient subtracting processing unit 807.

A quantizing unit 809 quantizes coefficients stored in the subtraction result memory unit 808 subband by subband, and a variable length coding unit 810 is adapted to decrease the information amount of the entire data by allotting a larger amount of information to a data piece, of data pieces delivered out of the quantizing unit 809, which occurs at a higher probability.

Figure 7:
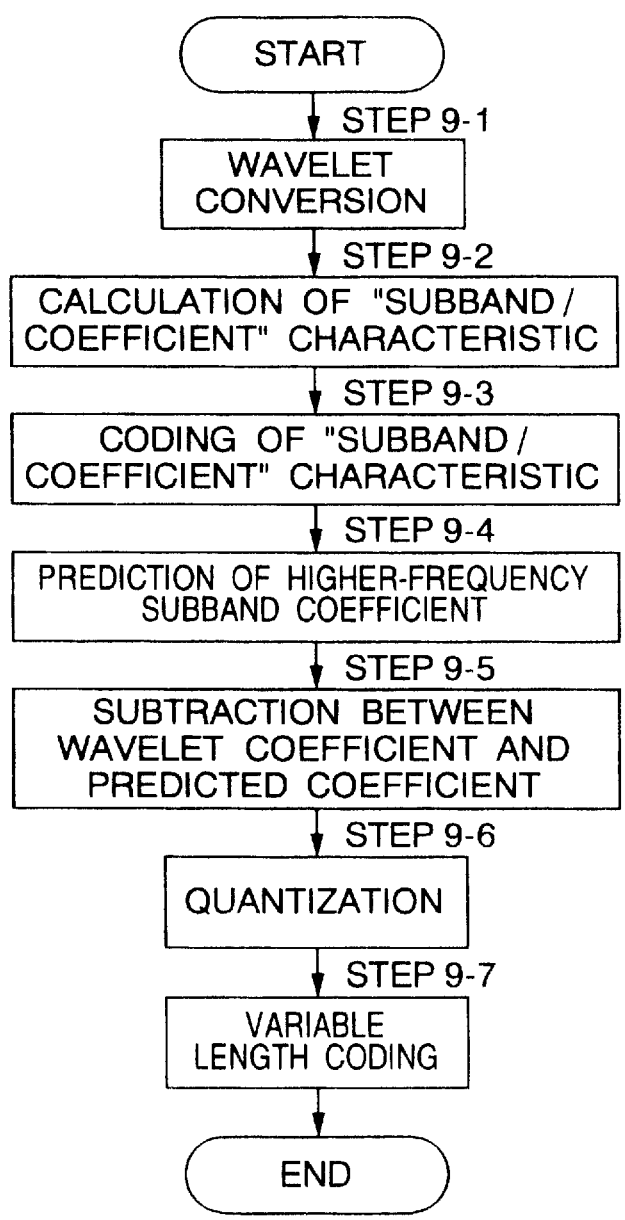
FIG. 7 is a flow chart showing image data compressing operation in embodiment 2 of the present invention.

An image compressing operation in the image compressing apparatus of embodiment 2 constructed as above will now be described with reference to a flow chart of FIG. 7.

It is presupposed that an image of one screen shown in FIG. 3 is stored in the frame memory 801 and through the wavelet conversion, the image is divided into 10 regions in four subbands of DC component, lower-frequency subband, intermediate-frequency subband and higher-frequency subband.

Firstly, in step 9-1, the wavelet converter 802 performs the wavelet conversion by making reference to the contents of the frame memory 801 and writes conversion results in the wavelet coefficient memory unit 803 as shown in, for example, FIG. 4. In step 9-2, the "subband/coefficient" characteristic calculating unit 804 determines an average of ratios each between a "coefficient of a lower-frequency subband" and a "coefficient of an intermediate-frequency subband" and an average of ratios each between a "coefficient of an intermediate-frequency subband" and a "coefficient of a higher-frequency subband" by making reference to the contents of the wavelet coefficient memory unit 803.

More specifically, in FIG. 4, a sum of a value which is four times a coefficient at coordinates (x, y) of W3HL, W3HH and W3LH and a coefficient at each of the coordinate points (2x, 2y), (2x+1, 2y), (2x, 2y+1) and (2x+1, 2y+1) of W2HL, W2HH and W2LH is obtained, ratios each between the thus obtained sums are determined for coordinates (x, y) in all regions, and the ratios are averaged to obtain a "subband/coefficient" characteristic of the intermediate-frequency subband. Similarly, a "subband/coefficient" characteristic of the higher-frequency subband is obtained from the W2HL, W2HH, W2LH and W1HL, W1HH and W1LH. Here, it is assumed that, for example, ¼ is obtained as an average of ratios each between a "coefficient of a lower-frequency subband" and a "coefficient of an intermediate-frequency subband" and ⅕ is obtained as an average of ratios each between a "coefficient of an intermediate-frequency subband" and a "coefficient of a higher-frequency subband".

In step 9-3, the variable length coding unit 810 codes, as "subband/coefficient" characteristics, the averaged ratio between the "lower-frequency subband" and the "intermediate-frequency subband" and the averaged ratio between the "intermediate-frequency subband" and the "higher-frequency subband" which are obtained in the step 9-2. This is because the resulting information is needed upon reconstruction of a compressed image.

In step 9-4, the subband coefficient predicting unit 805 predicts a coefficient of the intermediate-frequency subbands and a coefficient of the higher-frequency subbands by making reference to the averaged ratio between the "coefficient of the lower-frequency subband" and the "coefficient of the intermediate-frequency subband" and the averaged ratio between the "coefficient of the intermediate-frequency subband" and the "coefficient of the higher-frequency subband", these averaged ratios being delivered out of the "subband/coefficient" characteristic calculating unit 804, as well as a lower-frequency subband in the wavelet coefficient memory unit 803.

More specifically, in FIG. 4, a coefficient of the intermediate-frequency subbands represented by W2HL, W2HH and W2LH and a coefficient of the higher-frequency subbands represented by W1HL, W1HH and W1LH are predicted from a coefficient (having coordinates (x, y)) of the lower-frequency subbands represented by W3HL, W3HH and W3LH. More particularly, the "subband/coefficient" characteristic calculating unit 804 indicates that the coefficient of the intermediate-frequency subband is ¼ of the coefficient of the lower-frequency subband and therefore, on the assumption that the coefficient of the lower-frequency subband is fo at coordinates (x, y), the coefficient of the intermediate-frequency subbands is predicted to be fo/4 at coordinate points (2x, 2y), (2x+1, 2y), (2x, 2y+1) and (2x+1, 2y+1).

Further, on the assumption that the coefficient at coordinates (x, y) is f1, the coefficient of the higher-frequency subband is similarly predicted to be f1/5 at coordinate points (2x, 2y,), (2x+1, 2y), (2x, 2y+1) and (2x+1, 2y+1). The coefficients predicted by the subband coefficient predicting unit 805 are written in the predicted coefficient memory unit 806.

The ensuing processing corresponds to the step 5-3 to step 5-5 in embodiment 1 and will not be described. Through the above operation, an image compressing apparatus for providing a high compression ratio can be realized.

In the present embodiment, the "subband/coefficient" characteristic is coded in the step 9-3 but similar effects can be obtained even when the "subband/coefficient" characteristic is coded in any step which is after step 9-3.

(Embodiment 3)

Figure 8:
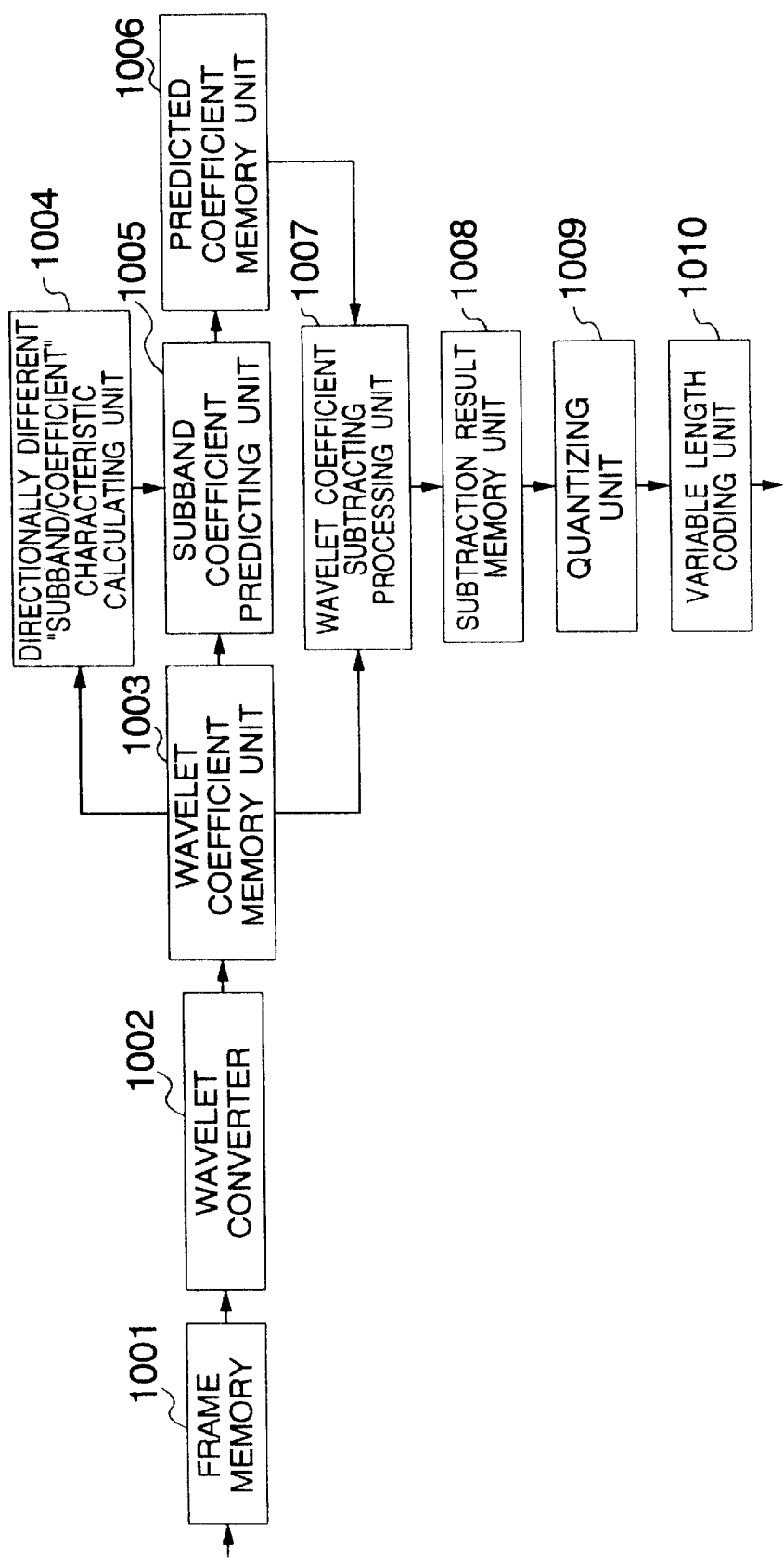
FIG. 8 is a block diagram showing the construction of a wavelet image compressing apparatus according to embodiment 3 of the present invention.

FIG. 8 is a circuit block diagram of an image compressing apparatus according to a third embodiment of the present invention.

Referring to FIG. 8, a frame memory 1001 stores image data of one screen. A wavelet converter 1002 divides an image of one screen into subbands through multiple steps by carrying out some cycles of the processing in which the band of an input signal delivered out of the frame memory 1001 is divided into halves by means of a low-pass filter and a high-pass filter and divided data pieces are each thinned out by down sampling to a half so as to decrease the data amount. A wavelet coefficient memory unit 1003 stores coefficients delivered out of the wavelet converter 1002.

A directionally different "subband/coefficient" characteristic calculating unit 1004 calculates "subband/coefficient" characteristics for an input image in longitudinal, transverse and oblique directions from a coefficient after the wavelet conversion stored in the wavelet coefficient memory unit 1003. By making reference to the contents of the wavelet coefficient memory unit 1003, the directionally different "subband/coefficient" characteristic calculating unit 1004 determines an average of ratios each between a "coefficient of a lower-frequency subband" and a "coefficient of an intermediate-frequency subband" and an average of ratios each between a "coefficient of an intermediate-frequency subband" and a "coefficient of a higher-frequency subband" in connection with each of the longitudinal, transverse and oblique directions.

A subband coefficient predicting unit 1005 predicts a coefficient of the higher-frequency subband by making reference to a coefficient of the lower-frequency subband stored in the wavelet coefficient memory unit 1003 and an output of the directionally different "subband/coefficient" characteristic calculating unit 1004, and a predicted coefficient memory unit 1006 stores the coefficient predicted by the subband coefficient predicting unit 1005. A wavelet coefficient subtracting processing unit 1007 performs subtraction between the coefficient of the higher-frequency subband stored in the predicted coefficient memory unit 1006 and a subband coefficient stored in the wavelet coefficient memory unit 1003 at the same position as that for the predicted coefficient, and a subtraction result memory unit 1008 stores results of subtraction by the wavelet coefficient subtracting processing unit 1007.

A quantizing unit 1009 quantizes coefficients stored in the subtraction result memory unit 1008 subband by subband, and a variable length coding unit 1010 is adapted to decrease the information amount of the entire data by allotting a larger amount of information to a data piece, of data pieces delivered out of the quantizing unit 1009, which occurs at a higher probability.

Figure 9:
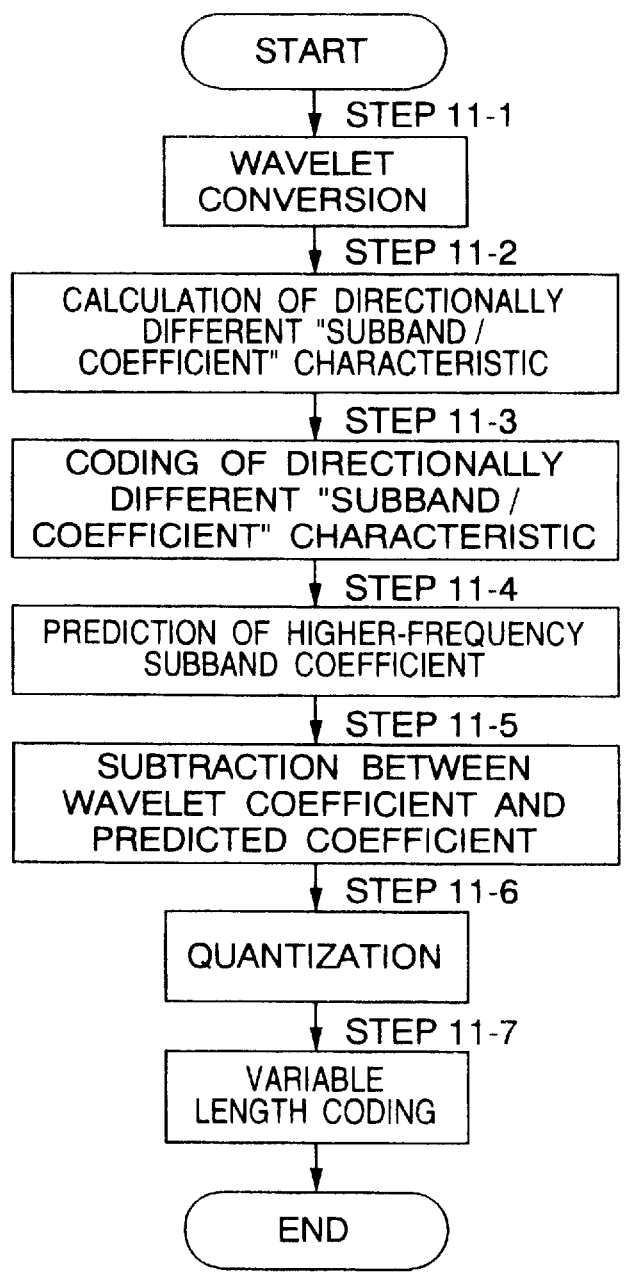
FIG. 9 is a flow chart showing image data compressing operation in embodiment 3 of the present invention.

An image compressing operation in the image compressing apparatus of embodiment 3 constructed as above will now be described with reference to a flow chart of FIG. 9.

It is presupposed that an image of one screen shown in FIG. 3 is stored in the frame memory 1001 and through the wavelet conversion, the image is divided into 10 regions in four subbands of DC component, lower-frequency subband, intermediated-frequency subband and higher-frequency subband.

Firstly, in step 11-1, the wavelet converter 1002 performs the wavelet conversion by making reference to the contents of the frame memory 1001 and writes conversion results in the wavelet coefficient memory unit 1003 as shown in FIG. 4.

In step 11-2, the directionally different "subband/coefficient" characteristic calculating unit 1004 determines an average of ratios each between a "coefficient of a lower-frequency subband" and a "coefficient of an intermediate-frequency subband" and an average of ratios each between a "coefficient of an intermediate-frequency subband" and a "coefficient of a higher-frequency subband" in connection with each of the longitudinal, transverse and oblique directions by making reference to the contents of the wavelet coefficient memory unit 1003.

More specifically, in FIG. 4, a sum of a value which is four times a coefficient at coordinates (x, y) of W3LH and a coefficient at each of the coordinate points (2x, 2y), (2x+1, 2y), (2x, 2y+1) and (2x+1, 2y+1) of W2LH is obtained, ratios each between the thus obtained sums are determined, and the ratios are averaged for the entire space of W2LH to obtain a longitudinal "subband/coefficient" characteristic of the intermediate-frequency subband. Similarly, a transverse "subband/coefficient" characteristic of the intermediate-frequency subband can be obtained from W3HL and W2HL and an oblique "subband/coefficient" characteristic of the intermediate-frequency subband can be obtained from W3HH and W2HH. Here, it is assumed that for the intermediate-frequency subband, ¼ is obtained in the longitudinal direction, ⅓ is obtained in the transverse direction and ½ is obtained in the oblique direction and for the higher-frequency subband, ⅙ is obtained in the longitudinal direction, ⅕ is obtained in the transverse direction and ½ is obtained in the oblique direction.

In step 11-3, an averaged ratio between the "coefficient of the lower-frequency subband" and the "coefficient of the intermediate-frequency subband" in each of the longitudinal, transverse and oblique directions and an averaged ratio between the "coefficient of the intermediate-frequency subband" and the "coefficient of the higher-frequency subband" in each of the longitudinal, transverse and oblique directions, which are obtained in the step 11-2, are coded by means of the variable length coding unit 1010. This is because the resulting information is needed upon reconstruction of a compressed image.

In step 11-4, the subband coefficient predicting unit 1005 predicts a coefficient of the intermediate-frequency subband in each of the longitudinal, transverse and oblique directions and a coefficient of the higher-frequency subband in each of the longitudinal, transverse and oblique directions by making reference to the averaged ratio between the "coefficient of the lower-frequency subband" and the "coefficient of the intermediate-frequency subband" in each of the longitudinal, transverse and oblique directions and the averaged ratio between the "coefficient of the intermediate-frequency subband" and the "coefficient of the higher-frequency subband" in each of the longitudinal, transverse and oblique directions, which are delivered out of the directionally different "subband/coefficient" characteristic calculating unit 1004, as well as a lower-frequency subband in the wavelet coefficient memory unit 1003.

More specifically, in FIG. 4, a coefficient of the intermediate-frequency subbands represented by W2HL, W2HH and W2LH and a coefficient of the higher-frequency subbands represented by W1HL, W1HH and W1LH are predicted from a coefficient (having coordinates (x, y)) of the lower-frequency subbands represented by W3HL, W3HH and W3LH.

More particularly, the directionally different "subband/coefficient" characteristic calculating unit 1004 indicates in the step 11-2 that the coefficient of the intermediate-frequency subband in the longitudinal direction is ¼ of the coefficient of the lower-frequency subband and therefore, on the assumption that the coefficient of the lower-frequency subband is fo at coordinates (x, y), the coefficient of an intermediate-frequency subband in the longitudinal direction shown at W2LH in FIG. 4 is predicted to be fo/4 at coordinate points (2x, 2y), (2x+1, 2y), (2x, 2y+1) and (2x+1, 2y+1). Similar prediction is carried out for the intermediate frequency in the transverse and oblique directions and for the higher-frequency in the longitudinal, transverse and oblique directions and resulting coefficients are written in the predicted coefficient memory unit 1006.

The ensuing processing corresponds to the step 5-3 to step 5-5 in embodiment 1 and will not be described. Through the above operation, an image compressing apparatus for providing a high compression ratio can be realized.

(Embodiment 4)

Figure 10:
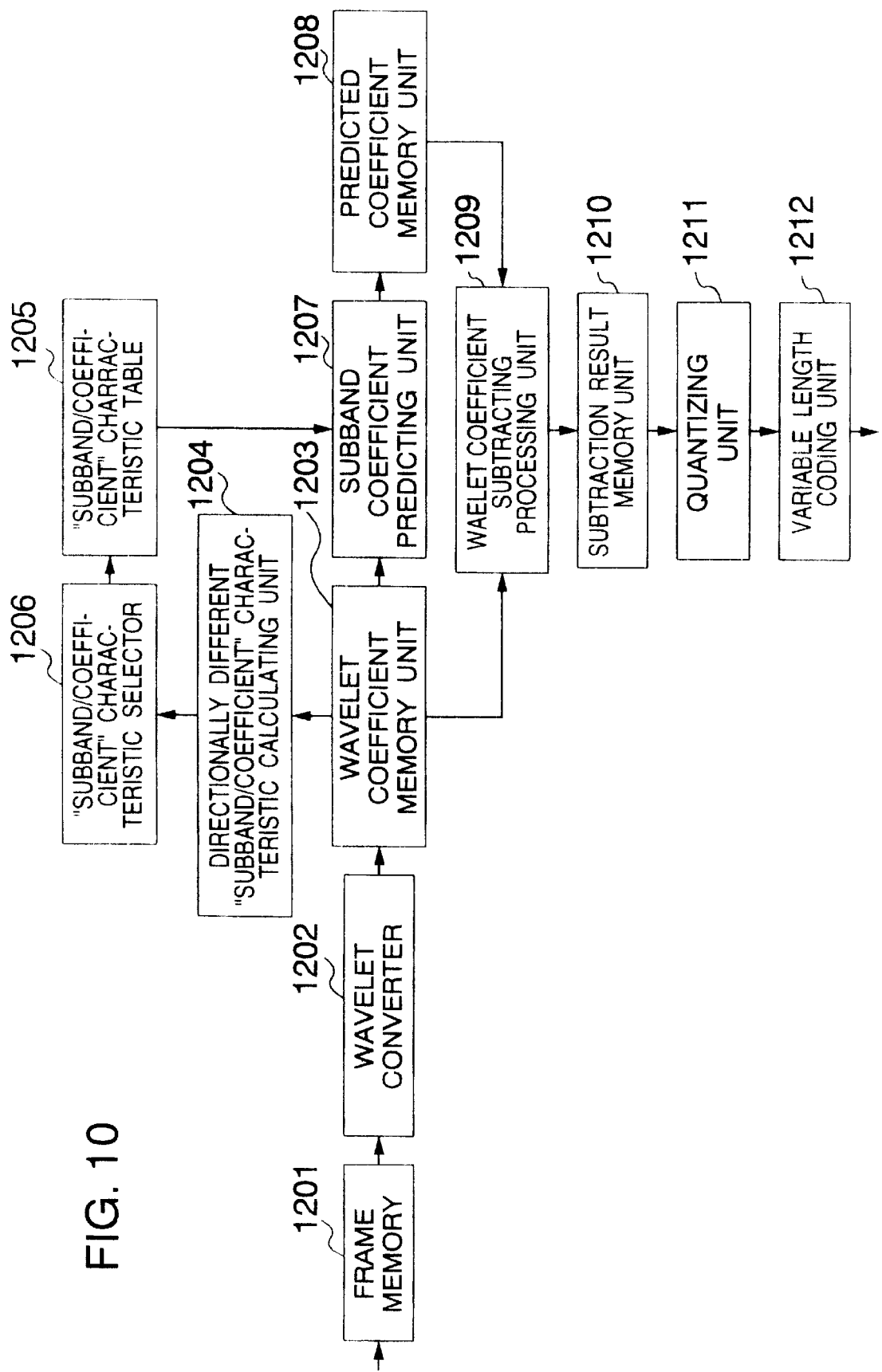
FIG. 10 is a block diagram showing the construction of a wavelet image compressing apparatus according to embodiment 4 of the present invention.

FIG. 10 is a circuit block diagram of an image compressing apparatus according to a fourth embodiment of the present invention.

Referring to FIG. 10, a frame memory 1201 stores image data of one screen. A wavelet converter 1202 divides an image of one screen into subbands through multiple steps by carrying out some cycles of the processing in which the band of an input signal delivered out of the frame memory 1201 is divided into halves by means of a low-pass filter and a high-pass filter and divided data pieces are each thinned out by down sampling to a half so as to decrease the data amount, and a wavelet coefficient memory unit 1203 stores coefficients delivered out of the wavelet converter 1202.

A directionally different "subband/coefficient" characteristic calculating unit 1204 calculates "subband/coefficient"

characteristics for an input image in longitudinal, transverse and oblique directions from a coefficient after the wavelet conversion stored in the wavelet coefficient memory unit 1203. A "subband/coefficient" characteristic table 1205 stores typical "subband/coefficient" characteristics. A "subband/coefficient" characteristic selector 1206 decides which one of "subband/coefficient" characteristics stored in the "subband/coefficient" characteristic table 1205 a "subband/coefficient" characteristic for a present input image obtained by the directionally different "subband/coefficient" characteristic calculating unit 1204 is the most proximate to.

A subband coefficient predicting unit 1207 predicts a coefficient of a higher-frequency subband from a coefficient of a lower-frequency subband by utilizing a "subband/coefficient" characteristic selected from the "subband/coefficient" characteristic table 1205 by means of the "subband/coefficient" characteristic selector 1206, and a predicted coefficient memory unit 1208 stores the coefficient predicted by the subband coefficient predicting unit 1207. A wavelet coefficient subtracting processing unit 1209 performs subtraction between the coefficient of the higher-frequency subband stored in the predicted coefficient memory unit 1208 and a subband coefficient stored in the wavelet coefficient memory unit 1203 at the same position as that for the predicted coefficient, and a subtraction result memory unit 1210 stores results of subtraction by the wavelet coefficient subtracting processing unit 1209.

A quantizing unit 1211 quantizes coefficients stored in the subtraction result memory unit 1210 subband by subband, and a variable length coding unit 1212 is adapted to decrease the information amount of the entire data by allotting a larger amount of information to a data piece, of data pieces delivered out of the quantizing unit 1211, which occurs at a higher probability. The contents of the "subband/coefficient" characteristic table 1205 is shown in FIG. 11. A characteristic is selected in which coefficients in the longitudinal, transverse and oblique directions are the most proximate to those in the characteristic table 1205.

Figure 12:
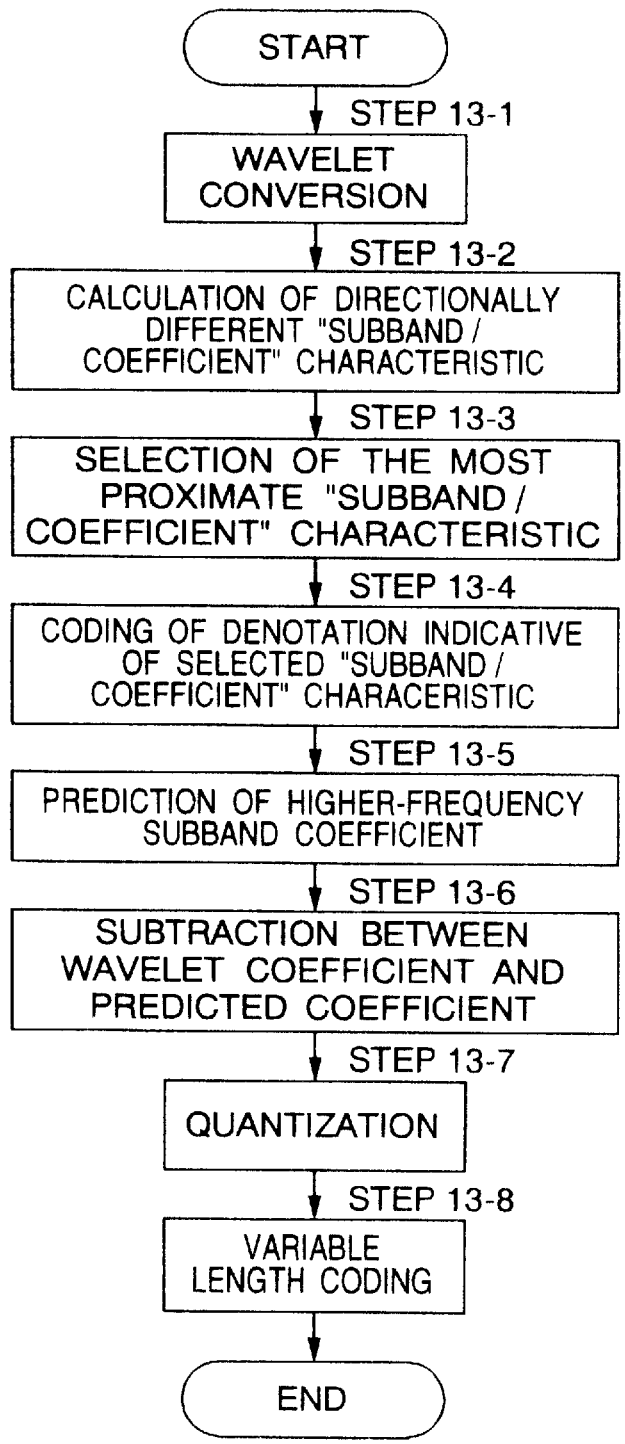
FIG. 12 is a flow chart showing image data compressing operation in embodiment 4 of the present invention.
Figure 13:
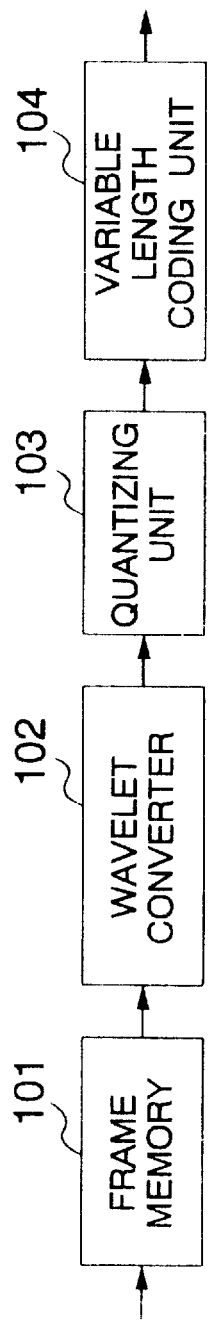
FIG. 13 is a block diagram showing the construction of a conventional wavelet image compressing apparatus.
Figure 14:
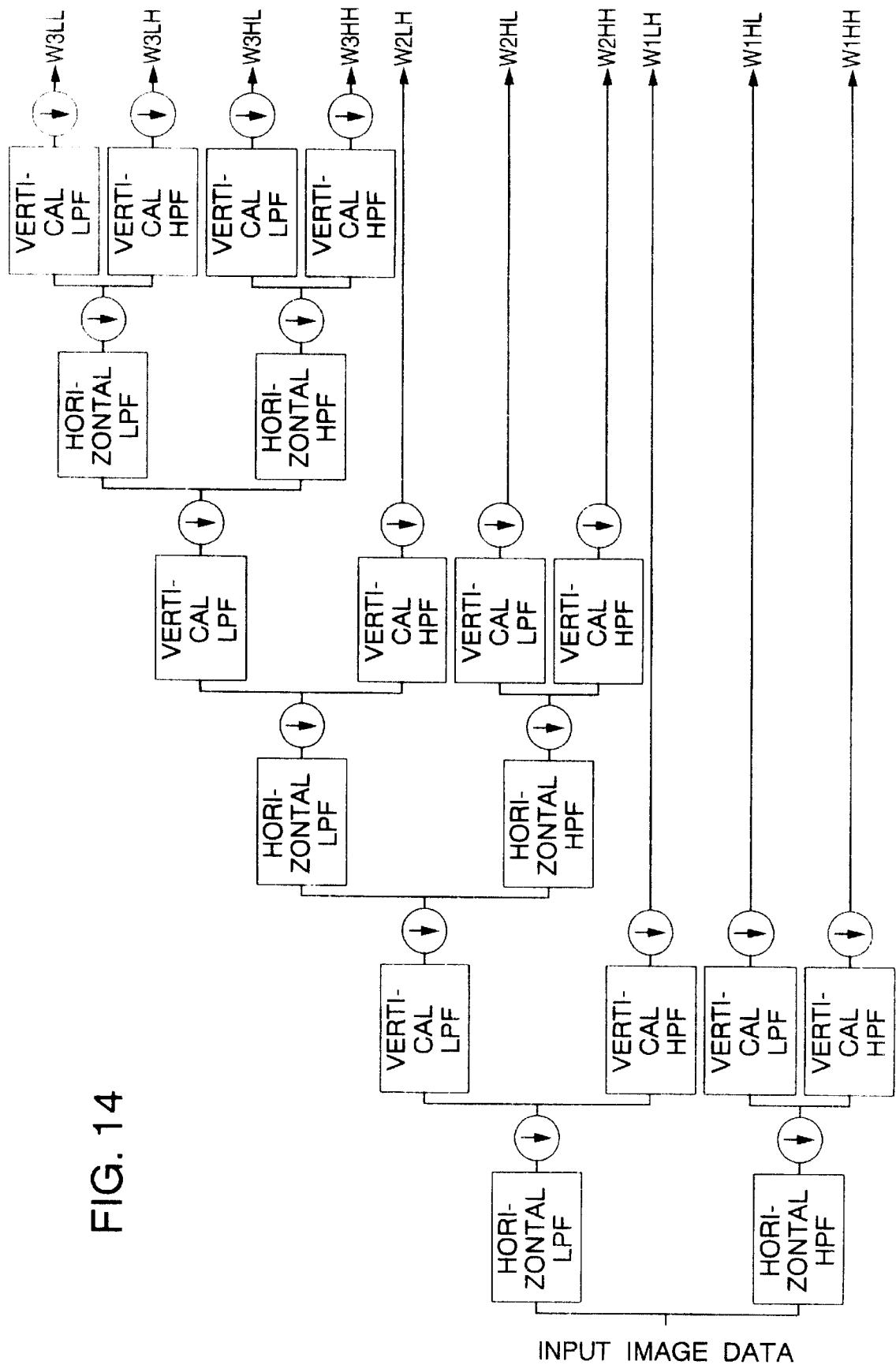
FIG. 14 is a diagram showing details of wavelet conversion.

An image compressing operation in the image compressing apparatus of embodiment 4 constructed as above will now be described with reference to a flow chart of FIG. 12.

It is presupposed that an image of one screen shown in FIG. 3 is stored in the frame memory 1201 and through the wavelet conversion, the image is divided into 10 regions in four subbands of DC component, lower-frequency subband, intermediate-frequency subband and higher-frequency subband.

Firstly, in step 13-1, the wavelet converter 1202 performs the wavelet conversion by making reference to the contents of the frame memory 1201 and writes conversion results in the wavelet coefficient memory unit 1203 as shown in FIG. 4.

In step 13-2, the directionally different "subband/coefficient" characteristic calculating unit 1204 determines an average of ratios each between a "coefficient of a lower-frequency subband" and a "coefficient of an intermediate-frequency subband" and an average of ratios each between a "coefficient of an intermediate-frequency subband" and a "coefficient of a higher-frequency subband" by making reference to the contents of the wavelet coefficient memory unit 1203.

More specifically, in FIG. 4, a sum of a value which is four times a coefficient at coordinates (x, y) of W3LH and a coefficient at each of the coordinate points (2x, 2y), (2x+1, 2y), (2x, 2y+1) and (2x+1, 2y+1) of W2LH is obtained, ratios each between the thus obtained sums are determined, and the ratios are averaged for the entire space of W2LH to obtain a longitudinal "subband/coefficient" characteristic of the intermediate-frequency subband. Similarly, a transverse "subband/coefficient" characteristic of the intermediate-frequency subband can be obtained from W3HL and W2HL and an oblique "subband/coefficient" characteristic of the intermediate-frequency subband can be obtained from W3HH and W2HH.

Here, it is assumed that for the intermediate-frequency subband, ¼ is obtained in the longitudinal direction, ⅓ is obtained in the transverse direction and ¼ is obtained in the oblique direction and for the higher-frequency subband, ⅛ is obtained in the longitudinal direction, ½ is obtained in the transverse direction and ⅛ is obtained in the oblique direction.

In step 13-3, the "subband/coefficient" characteristic selector 1206 decides which one of "subband/coefficient" characteristics registered in the "subband/coefficient" characteristic table 1205 and shown in FIG. 11 the directionally different "subband/coefficient" characteristics for the intermediate-frequency subband and higher-frequency subband obtained in the step 13-2 are the most proximate to.

More specifically, a difference is obtained between the contents of the "subband/coefficient" characteristic table 1205 and individual items of output results of the directionally different "subband/coefficient" characteristic calculating unit 1204 and evaluation is carried out by using the sum of absolute values of the differences. In this case, the contents in denotation "4" in FIG. 11 can be determined to be the most proximate.

In step 13-4, denotations indicative of "subband/coefficient" characteristics obtained in the step 13-3 are coded by the variable length coding unit 1212. In the above example, "4" is coded. This is because the resulting information is needed upon reconstruction of a compressed image.

In step 13-5, the subband coefficient predicting unit 1207 predicts a coefficient of the intermediate-frequency subband in each of the longitudinal, transverse and oblique directions and a coefficient of the higher-frequency subband in each of the longitudinal, transverse and oblique directions by making reference to the denotation indicative of the "subband/coefficient" characteristic obtained in the step 13-4 and the "subband/coefficient" characteristic table 1205.

Predicting operation is the same for embodiments 3 and 4 with only the exception that while in embodiment 3 the directionally different "subband/coefficient" characteristics are consulted, the denotation indicative of the "subband/coefficient" characteristic obtained in the step 13-4 and the "subband/coefficient" characteristic table 1205 are consulted in embodiment 4, and therefore, will not be described in detail.

The ensuing processing corresponds to the step 5-3 to step 5-5 in embodiment 1 and will not be described. Through the above operation, an image compressing apparatus for providing a high compression ratio can be realized.

I claim:

1. An image processing method using, as a conversion mode of image compressing processing, wavelet conversion for decomposing image data of an input image into image data pieces of a plurality of frequency subbands including at least one higher-frequency subband and at least one lower-frequency subband, the method comprising:

(a) comparing a coefficient of said at least one higher-frequency subband with a coefficient of said at least one lower-frequency subband on wavelet space;

(b) calculating a ratio of the coefficient of said at least one higher-frequency subband to the coefficient of the at least one lower-frequency subband to provide a subband/coefficient characteristic;

(c) predicting the coefficient of said at least one higher-frequency subband from the coefficient of a lower-frequency subband to derive a predicted coefficient by utilizing the subband/coefficient characteristic to calculate the predicted coefficient; and (d) when the at least one higher-frequency subband space is coded, determining a difference between the predicted coefficient and an actual value of the coefficient and coding the difference together with said subband/coefficient characteristic.

2. An image compressing method according to claim 1, wherein:

step (b) comprises calculating directionally different subband/coefficient characteristics in longitudinal, transverse and oblique directions on the wavelet space in consideration of a correlation between the data pieces of the input image in longitudinal, transverse and oblique directions; and step (d) comprises coding, when the at least one higher frequency subband space is coded, only the difference from the predicted coefficient together with said directionally different subband/coefficient characteristics.

3. An image compressing method according to claim 1, wherein:

the plurality of frequency subbands comprise a low-frequency subband, a intermediate-frequency subband and a high-frequency subband; and each of steps (a)–(c) is carried out with respect to (i) the coefficient of the intermediate-frequency subband and the frequency of the low-frequency subband and (ii) the coefficient of the high-frequency subband and the coefficient of the intermediate-frequency subband.

4. An image compressing method according to claim 3, wherein the plurality of frequency subbands further comprise a DC subband.

5. An image compressing method for compressing an image having image data in a plurality of subbands including at least one higher-frequency subband and at least one lower-frequency subband, the method comprising:

(a) storing a plurality of predictable typical subband/coefficient characteristics which are respectively assigned with denotations in a subband/coefficient characteristic table in advance;

(b) comparing a coefficient of said at least one higher-frequency subband with a coefficient of said at least one lower-frequency subband on wavelet space to calculate a ratio of the coefficient of said at least one higher-frequency subband to the coefficient of said at least one lower-frequency subband;

(c) determining which one of the typical subband/coefficient characteristics stored in said subband/coefficient characteristic table the ratio calculated in step (b) is most proximate to; and (d) when said at least one higher-frequency subband space is coded, indicating the subband/coefficient characteristic determined in step (c) by a corresponding one of the denotations, coding the corresponding one of the denotations and coding only a difference from a coefficient predicted from the subband/coefficient characteristic determined in in step (c).

6. An image compressing method according to claim 5, wherein:

the plurality of frequency subbands comprise a low-frequency subband, a intermediate-frequency subband and a high-frequency subband; and each of steps (a)–(c) is carried out with respect to (i) the coefficient of the intermediate-frequency subband and the frequency of the low-frequency subband and (ii) the coefficient of the high-frequency subband and the coefficient of the intermediate-frequency subband.

7. An image compressing method according to claim 6, wherein the plurality of frequency subbands further comprise a DC subband.

8. An image compressing apparatus comprising:

a frame memory for storing image data for an input image;

a wavelet converter for dividing the image data into subbands, the subbands including at least one higher-frequency subband and at least one lower-frequency subband, and for delivering coefficients corresponding to the subbands;

a wavelet coefficient memory unit for storing the coefficients delivered out of said wavelet converter;

a subband coefficient predicting unit for predicting the coefficient of said at least one higher-frequency subband from the coefficient of said at least one lower-frequency subband stored in said wavelet coefficient memory unit to provide a predicted coefficient;

a predicted coefficient memory unit for storing the predicted coefficient predicted by said subband coefficient predicting unit;

a wavelet coefficient subtracting processing unit for performing subtraction between the predicted coefficient of the higher-frequency subband stored in said predicted coefficient memory unit and the coefficient stored in said wavelet coefficient memory unit at a same position as a position for the predicted coefficient;

a subtraction result memory unit for storing results of subtraction by said wavelet coefficient subtracting processing unit;

a quantizing unit for quantizing, subband by subband, the results of subtraction stored in said subtraction result memory unit to produce data pieces;

a variable length coding unit for decreasing an information amount of the image data by allotting a larger amount of information to a data piece, of the data pieces delivered out of said quantizing unit, which occurs at a higher probability; and a subband/coefficient characteristic calculating unit for calculating, from at least one of the coefficients stored in said wavelet coefficient memory unit, a subband/coefficient characteristic indicative of a ratio of said at least one higher-frequency subband to the coefficient of the at least one lower-frequency subband in connection with ratios between the coefficients of the respective subbands for the input image, wherein the subband coefficient predicting unit predicts the coefficient of the at least one higher-frequency subband from the coefficient of the at least one lower-frequency subband to produce a predicted coefficient by utilizing said subband/coefficient characteristic, and the variable length coding unit codes only a difference from the predicted coefficient together with said subband/coefficient characteristic.

9. An image compressing apparatus according to claim 8, wherein the image data stored in the frame memory are image data for one image.

10. An image compressing apparatus according to claim 8, wherein the wavelet converter converts the image data into the subbands through multiple steps by carrying out some cycles of the processing in which a band of the input data delivered out of said frame memory is divided into halves by means of a low-pass filter and a high-pass filter and the halves are each thinned out by down sampling to a half so as to decrease a data amount.

11. An image compressing apparatus according to claim 8, wherein:

the subbands comprise a higher-frequency subband, an intermediate-frequency subband and a lower-frequency subband; and the subband/coefficient characteristic calculating unit calculates the subband/coefficient characteristic indicative of a ratio of the higher-frequency subband and the intermediate-frequency subband to the coefficient of the lower-frequency subband.

12. An image compressing apparatus comprising:

a frame memory for storing image data of an input image;

a wavelet converter for dividing the image data into subbands, the subbands including at least one higher-frequency subband and at least one lower-frequency subband, and for delivering coefficients corresponding to the subbands;

a wavelet coefficient memory unit for storing the coefficients delivered out of said wavelet converter;

a subband coefficient predicting unit for predicting the coefficient of said at least one higher-frequency subband from the coefficient of said at least one lower-frequency subband stored in said wavelet coefficient memory unit to provide a predicted coefficient;

a predicted coefficient memory unit for storing the predicted coefficient predicted by said subband coefficient predicting unit;

a wavelet coefficient subtracting processing unit for performing subtraction between the predicted coefficient of the higher-frequency subband stored in said predicted coefficient memory unit and the coefficient stored in said wavelet coefficient memory unit at a same position as a position for the predicted coefficient;

a subtraction result memory unit for storing results of subtraction by said wavelet coefficient subtracting processing unit;

a quantizing unit for quantizing, subband by subband, the results of subtraction stored in said subtraction result memory unit to produce data pieces;

a variable length coding unit for decreasing an information amount of the image data by allotting a larger amount of information to a data piece, of the data pieces delivered out of said quantizing unit, which occurs at a higher probability; and a directionally different subband/coefficient characteristic calculating unit for calculating, from at least one of the coefficients stored in said wavelet coefficient memory unit, a directionally different subband/coefficient characteristic indicative of a ratio of each of the coefficients of the at least one higher-frequency subband to the coefficient of the at least one lower-frequency subband in connection with ratios between the coefficients of respective subbands for the input image in longitudinal, transverse and oblique directions, wherein the subband coefficient predicting unit predicts the coefficient of the at least one higher-frequency subband from the coefficient of the at least one lower-frequency subband to produce a predicted coefficient by utilizing the directionally different subband/coefficient characteristics, and the variable length coding unit codes only a difference from the predicted coefficient together with the directionally different subband/coefficient characteristics.

13. An image compressing apparatus according to claim 12 further comprising:

a subband/coefficient characteristic table for storing typical subband/coefficient characteristics; and a subband/coefficient characteristic selector for deciding which one of the typical subband/coefficient characteristics stored in said subband/coefficient characteristic table the subband/coefficient characteristic obtained by said directionally different subband/coefficient characteristic calculating unit is the most proximate to.

14. An image compressing apparatus according to claim 12, wherein the image data stored in the frame memory are image data for one image.

15. An image compressing apparatus according to claim 12, wherein the wavelet converter converts the image data into the subbands through multiple steps by carrying out some cycles of the processing in which a band of the input data delivered out of said frame memory is divided into halves by means of a low-pass filter and a high-pass filter and the halves are each thinned out by down sampling to a half so as to decrease a data amount.

16. An image compressing apparatus according to claim 12, wherein:

the subbands comprise a higher-frequency subband, an intermediate-frequency subband and a lower-frequency subband; and the directionally different subband/coefficient characteristic calculating unit calculates the directionally different subband/coefficient characteristic indicative of a ratio of the higher-frequency subband and the intermediate-frequency subband to the coefficient of the lower-frequency subband.

\* \* \* \* \*